United States Patent [19]

Hoffner, II

[11] 3,753,230

[45] Aug. 14, 1973

[54] METHODS AND APPARATUS FOR UNIT-DISTANCE COUNTING AND ERROR-DETECTION

[75] Inventor: Charles William Hoffner, II, Columbus, Ohio

[73] Assignee: Bell Telephone Laboratories, Incorporated, Murray Hill, Berkeley Heights, N.J.

[22] Filed: Jan. 3, 1972

[21] Appl. No.: 214,622

[52] U.S. Cl. ................. 340/146.1 AL, 235/92 EC, 340/146.1 AV

[51] Int. Cl. ............................................ G06f 11/00

[58] Field of Search ............... 340/146.1, 146.1 AL, 340/146.1 AV, 146.1 R, 347 DD; 235/153 AP, 92 EC, 92 GD; 307/220, 225

[56] References Cited

UNITED STATES PATENTS 3,196,258 7/1965 Belcastro ........................ 235/92 EC 3,569,956 3/1971 Duffy ........................... 340/347 DD 3,588,461 6/1971 Halsall ......................... 340/347 DD

OTHER PUBLICATIONS

Sellers et al., Error Detecting Logic for Digital Computers, McGraw-Hill Co., 1968, pp. 197–201.

*Primary Examiner*—Charles E. Atkinson

*Attorney*—W. L. Keefauver

[57] ABSTRACT

A large class of multiple-error-correcting unit-distance counting codes and associated coding apparatus are presented. The class of codes includes the gray codes, the Kautz codes, and the twisted ring counter codes as subclasses. The class of codes is of special importance because it is generated by counting circuitry which can be simply implemented. Furthermore, a subset of the codes has an easily determined conversion relationship to the ordinary binary counting codes that can be used as the basis for a simple error-detection method.

5 Claims, 6 Drawing Figures

METHODS AND APPARATUS FOR UNIT-DISTANCE COUNTING AND ERROR-DETECTION

BACKGROUND OF THE INVENTION

1. Field of the Invention

The present invention relates to data processing and data transmission systems and, more particularly, to the detection and correction of errors in information signals processed by those systems.

2. Prior Art

The present invention deals with the class of codes known generally as "unit-distance counting codes" and typified in the prior art by the well-known Gray codes. These codes, also known as "snake-in-the-box" (SIB) codes, have been treated in various prior art publications. The general class of counting codes in detailed in a paper by B. Lippel entitled, "A Decimal Code for Analog to Digital Conversion," IRE Transactions, Vol. EC-4, Dec. 1955, pages 158–159. This paper includes extensions of still other prior art teachings including those described in U.S. Pat. No. 2,632,058, issued Mar. 17, 1953, to F. Gray. The codes described in the latter patent are, of course, the well-known Gray codes, themselves. A sequel to the above-cited Lippel paper by H. E. Tompkins, "Unit Distance Binary Codes for Two-Track Commutation," IRE Transactions, Vol. EC-5, Sept. 1956, page 139, describes a generalization of the basic Gray code concepts to other than the exact Gray code configuration.

Additional codes related to the unit-distance counting codes are described in R. K. Richards, "Arithmetic Computations in Digital Computers," Van Nostrand, New York, 1955, and I. Flores, "Reflected Number Systems," IRE Transactions, Vol. EC-5, June 1956, pages 79–82. In addition, W. H. Kautz, "Unit-Distance Error-Checking Codes," IRE Transactions, Vol. EC-7, June 1958, pages 179–180, describes a generalization of the basic unit-distance code concepts for purposes of achieving error checking. A more recent paper by Kautz illustrates a particular class of unit-distance counting codes with error checking capabilities. Specifically, this last-mentioned class of codes is described in W. H. Kautz, "A Readily Implemented Single-Error-Correcting Unit-Distance Counting Code," IEEE Transactions, Vol. C-19, Oct. 1970, pages 972–975. Other literature references useful in connection with a review of the general field of unit-distance counting codes are R. C. Singleton, "Generalized Snake-in-the-Box Codes," IEEE Transactions, Vol. EC-15, Aug. 1966, pages 596–602; R. T. Chien, C. V. Freiman, and D. T. Tang, "Error Correction and Circuits on the n-Cube," Proceedings Second Allerton Conference on Circuit and System Theory, pages 899–912, 1964; and E. N. Gilbert, "Gray Codes and Paths on the n-Cube," BSTJ, Vol. 37, 1958, pages 815–826.

The above-described prior art publications have been directed primarily to techniques for simply characterizing and enumerating optimal codes (optimal in the sense of having the maximum number of code words for a given word length) and to only the very basic aspects of methods and apparatus for counting and error checking. Except for a specialized design for single-error-correcting counting codes, complicated apparatus was required for error checking systems using counting codes. Further, such apparatus was necessarily designed on a costly and time-consuming per code basis.

It is therefore an object of the present invention that a class of multiple-error-correcting counting codes, and "programmable" counting apparatus for implementing those codes, be provided.

It is an additional object of the present invention that a simple economical error checking method and apparatus for pulse code systems be provided.

SUMMARY OF THE INVENTION

An important aspect of the present invention relates to the generalization of the above-mentioned Kautz and Gray codes and the manner of implementing this larger class of codes. In particular, codes that can correct an arbitrary number of errors may be generated in a straightforward manner by a combination of well-known simple hardware elements. In short, a clock circuit provides signals to an array of identical so-called "twisted ring counters." The output signals from the array of twisted ring counters constitute the particular patterns for a code word.

Each of the twisted ring counters is activated in accordance with the present invention by the output signals from a respective portion of the clock circuit and there is no interaction among the twisted ring counters. The clock circuit, in turn, assumes the particularly simple form of a standard r-stage Gray code counter. In particular, when an output from that stage of the Gray code counter associated with a specific twisted ring counter experiences a change of state, the corresponding twisted ring counter is advanced to a new state, thereby generating a new code word in the counting sequence. The error-correcting capability of the instant codes derives from the fact that not all possible words are valid code words. It is thereby possible to detect errors by determining when an invalid code word has been received.

Another important aspect of the present invention relates to the manner of accomplishing error detection. Briefly, when an n-digit code word is received from a transmission channel, it is temporarily stored. in addition, a doubly transformed version of this received code word is generated. A "forward" transformation in accordance with the present invention is performed in a prescribed many-to-one fashion, thereby realizing an m-digit word which is not uniquely associated with a particular input n-digit code word. A "reverse" transformation in accordance with the present invention is performed in a prescribed one-to-one fashion, thereby realizing an n-digit doubly transformed code word which is uniquely associated with a particular input m-digit word. Because of the properties of the transformations, the doubly transformed code word will be the same as the original received code word if and only if the original received code word was a valid code word.

Acordingly, a comparison is made at the receiver between the originally received (and temporarity stored) code word and the doubly transformed version of it. If a positive comparison is indicated, it is certain that the received code word was a valid code word; if a negative comparison is made, it necessarily follows that the received code word was not a valid code word. In the latter instance, an error in the received code word will have been detected. The circuitry for implementing the indicated double transformation and comparison assumes a particularly simple form for a certain subclass of the general class of codes disclosed.

It is a feature of the present invention that simplified techniques and circuitry are provided for detecting errors in data transmission systems.

It is a further feature of the present invention that particularly efficient counting circuitry is provided for use in systems processing pulse-coded information. It is a more specific feature of the present invention that standard-design Gray code counters are used for producing clocking signals for an array of standard-design twisted ring counters to generate the counting sequence.

BRIEF DESCRIPTION OF THE DRAWING

The above and other objects and features of the instant invention will be more fully understood upon considering the detailed description of an illustrative embodiment in connection with the attached drawing wherein.

DETAILED DESCRIPTION

Theoretical Considerations for Code Construction

Figure 1:
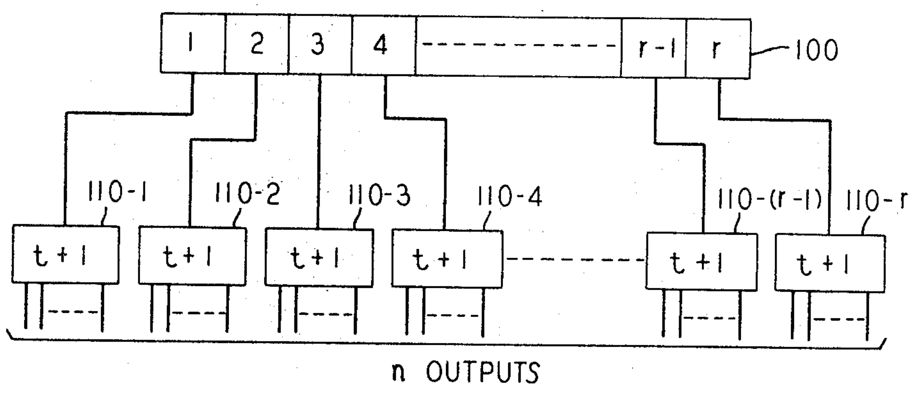
FIG. 1 is a block diagram representation of the general configuration for apparatus for generating words of a counting code in accordance with one aspect of the instant invention.

Before proceeding to a detailed description of a typical embodiment of apparatus in accordance with the instant invention, and the manner in which this and similar hardware may be used to effect the desired processing in accordance with the instant invention, it will prove useful to review and formalize certain definitions and rules of notation. These definitions and rules of notation will then be used to derive a number of useful mathematical results and to construct a new class of unit-distance counting codes. Succeeding sections will then present apparatus for generating and utilizing these codes.

To help in focusing on the essential results of these preliminary analyses, it is here noted that the codes obtained have length $n = r(t+1)$ and distance $k = 2t+1$. Further, there are $K = (t+1)2^r$ code words where $t$ 24 0 and $r \geq 2$. The codes permit $t$ errors to be corrected or 2t errors to be detected and are said to be multiple-error-correcting. It should also be noted that it is an inherent property of multiple-error-correcting unit-distance counting codes that correction or detection will sometimes displace a code word in the counting sequence; the displacement will be negligibly small, no more than $2t$ counts, as long as the number of errors does not exceed the error checking capability of the code.

A unit-distance counting code is an ordered sequence of q-ary vectors or words such that each vector differs from the preceding vector in exactly one component, and the first vector differs from the last vector in exactly one component. A $K \times n$ matrix $C$ whose $j^{th}$ row is $c_j$, $1 \leq j \leq K$, will be called a code if its row vectors form a unit-distance counting code when taken in sequence $c_1, c_2, c_3, \ldots, c_{K-1}, c_K$. Unless otherwise stated, it will be assumed that the vectors are binary, that is, $q = 2$. The symmetrical $K \times K$ matrix $D = [d_{ij}]$, where $d_{ij}$ is the number of components in which $c_i$ and $c_j$ are different, will be called the distance matrix for $C$.

If $C$ is a code and $d_{ij} \geq k$ for each pair of code vectors $c_i$, $c_j$ that are separated in the counting sequence by $k$ or more, then the code is said to have distance at least $k$; for $j \geq i$ the separation of $c_i$ and $c_j$ is simply the smaller of $j-i$ and $K-(j-i)$. If a code has distance at least $k$, then $d_{ij}$ is equal to the separation of $c_i$ and $c_j$ when their separation is less than $k$. A code is said to have distance exactly $k$ if it has distance at least $k$ but does not have distance at least $k+1$.

Let $A = [a_{ij}]$ be the $K \times K$ matrix such that $a_{ij} = d_{ij}$ when $d_{ij} \leq k$ and $a_{ij} = k$ when $d_{ij} > k$. Let $E$ be the $K \times K$ circulant matrix whose first row is $$e = (0\ 1\ 2 \ldots k-1\ k\ k\ k \ldots k\ k\ k\ k-1 \ldots 2\ 1).$$

Then if the columns of $C$ are partitioned into two submatrices $C_1$, $C_2$ with distance matrices $D_1$, $D_2$, respectively, and $A_1$, $A_2$ are computed from $D_1$, $D_2$, respectively, the validity of the following LEMMAs is obvious.

LEMMA 1: A code has distance at least $k$ if and only if $A = E$.

LEMMA 2: If $C = [C_1\ C_2]$, then $D = D_1+D_2$.

LEMMA 3: If $C = [C_1\ C_2]$, then $C$ is a code with distance at least $k$ if and only if $A_1+A_2 \geq E$.

LEMMA 4: If $D$ is a circulant matrix and $d$ is the first row of $D$, then $C$ is a code with distance at least $k$ if and only if $d \geq e$.

The inequality $D \geq A$ means that $d_{ij} \geq a_{ij}$, $1 \leq i \leq K$, $1 \leq j \leq K$. When the properties of circulants can be used, the determination of $k$ is greatly simplified.

DEFINITION: If $K$ is an even multiple of $n$ and if for $c_j = (w_1\ w_2\ w_3 \ldots w_{n-2}\ w_{n-1})$ it is true that $c_{j+1} = (w_2\ w_3\ w_4 \ldots w_{n-1}\ w_n\ \overline{w}_1)$, $1 \leq j \leq K-1$, where the value of $\overline{w}_1$ is $w_1+1$ modulo 2, then $C$ is called a twisted ring counter code.

It follows from the definition that each column of a twisted ring counter code is a cyclic shift of the rightmost column, and that $c_j = c_{j+2n}$, $1 \leq j \leq K-2n$. From these observations, the validity of the following LEMMAs is obvious.

LEMMA 5: The distance matrix for a twisted ring counter code is circulant matrix.

LEMMA 6: A twisted ring counter code is a unit-distance counting code if and only if $K = 2n$ and $c_j$ is the all-zero vector for some $j$; the distance of the code is $k = n$.

The term twisted ring counter code will be used in the sequel to refer only to those twisted ring counter codes for which $c_j$ is the all-zero vector for some $j$. The for a twisted ring counter code, $d = (h\ h\ h \ldots h\ h\ h)$ where $d$ is the first row of $D$ and the subvector $h = (0\ 1\ 2 \ldots n-1\ n\ n-1 \ldots 2\ 1)$ is repeated $K/2n$ times.

Note that if $C = [C_1\ C_2]$ is a code, then at least one of $C_1$ and $C_2$ is not a code. Furthermore, if either $C_1$ or $C_2$ is a code, then $C$ is a code only if the rows of the other matrix are all the same. These simple observations suggest a method of modifying two codes so that if $C_1$ and $C_2$ are modified codes, then $C$ is a code.

Let $C^*$ be the $2K \times n$ matrix related to $C$ by $c^*_{2j-1} = c^*_{2j} = c_j$, $1 \leq j \leq K$. Let $C^{}$ be the $2K \times n$ matrix related to $C$ by $c^{}_{2j-2} = c^{}_{2j-1} = c_j$, $2 \leq j \leq K$, and $c^{}_1 = c^{**}_{2K} = c_1$. Let $D^*$ be the distance matrix for $C^*$. Then row $2j-1$ of $D^*$ is the same as row $2j$ and column $2j-1$ of $D^*$ is the same as column $2j$, $1 \leq j \leq K$. Let $D^{}$ be the distance matrix for $C^{}$. Then row $2j-2$ of $D^{}$ is the same as row $2j-1$, row 1 of $D^{}$ is the same as row $2K$, column $2j-2$ of $D^{}$ is the same as column $2j-1$, the column 1 of $D^{}$ is the same as column $2K$, $2 \leq j \leq K$. $A^*$ and $A^{**}$ are computed from $D^*$ and $D^{**}$ LEMMA 7: If $C_1$ and $C_2$ are code matrices having $K_1$ and $K_2$ rows, respectively, and $K_1 = K_2$, then the matrix $[C^*_1\ C^{**}_2]$ is a code.

THEOREM 1: If $C = [C^*_1\ C^{**}_2]$, where $K = 2K_1 = 2K_2$, $C_1$ has distance at least $k = 2t+1$, and $C_2$ is a twisted ring counter code with $t+1$ columns, then $C$ has distance exactly $k$.

PROOF: $C$ is a code from LEMMA 7. Since $D^*_1 \geq A^*_1$ and $D^{}_2 = A^{}_2$, the code has distance at least $k$ if and only if $A^*_1 + A^{**}_2 \geq E$ from LEMMA 3. Let $S = A^*_1 + A^{**}_2$ and let $s$ be the first row of $S$. From LEMMA 1, $A_1$ is a circulant matrix and, from LEMMA 5, $A_2$ is a circulant matrix. It follows that for both $A^*_1$ and $A^{**}_2$, and therefore for $S$, each odd numbered row is a cyclic shift of the first row, and each even numbered row in a cyclic shift of the second row. The first row of $A^*_1$ is $(001122 \ldots k-1\ k-1\ k\ k\ k\ k \ldots k\ k\ k\ k\ k-1\ k-1 \ldots 2211)$ and the second row of $A^*_1$ is the same as the first. The first row of $A^{}_2$ is $(01122 \ldots t\ t\ t+1\ t+1\ t\ t \ldots 2211001122 \ldots t\ t\ t+1\ t+1\ t\ t \ldots 22110)$ and the second row of $A^{}_2$ is the first row shifted cyclically two positions to the right. Note that, because of symmetry, the even numbered rows of S are the odd numbered rows written in reverse order. Consequently, recalling LEMMA 4, the code has distance at least $k$ if and only if $s \geq e$. Now $s$ is the sum of the first row of $A^*_1$ and the first row of $A^{**}_2$. Let $s = (s_1\ s_2\ s_3 \ldots s_{K-1}\ s_K)$. Then an examination of the first row of $A^*_1$ reveals that $s_i \geq k$ for $2k+1 \leq i \leq K-2k+2$. Furthermore, since $k = 2t+1$, the first $2k$ components of $s$ are $0\ 1\ 2\ 3 \ldots k-1\ k\ k+1\ k\ k+1 \ldots k\ k+1\ k$ and the last $2k-2$ components of $s$ are $k+1\ k+2\ k+1 \ldots k+2\ k+1\ k+2\ k+1\ k\ k-1 \ldots 3\ 2\ 1$. Thus, $s \geq e$ and the code has distance exactly $k$.

COROLLARY: For any $t \geq 0$ and any $r \geq 2$, there exists a code with $n = r(t+1)$, $k = 2t+1$, and $K = (t+1)2^r$.

PROOF: For $n = 2(t+1)$, a twisted ring counter code with $K = 2n$ has distance $k = n$ from LEMMA 6. If such a code is used as $C_1$ in the THEOREM, a new code with $n = 3(t+1)$, $K = 4n$, and $k = 2t+1$ results. The new code can then be used as $C_1$ in the THEOREM. Repetitive application of the THEOREM yields additional codes. Assume a code exists with $n = (r-1)(t+1)$, $k = 2t+1$, and $K = (t+1)2^{r-1}$ where $t \geq 0$ and $r \geq 3$. If this code is used as $C_1$ in the THEOREM, a new code with $n = r(t+1)$, $k = 2t+1$, and $K = (t+1)2^r$ results. Thus, for any $t \geq 0$ and any $r \geq 2$, there exists a code with $n = r(t+1)$, $k = 2t+1$, and $K = (t+1)2^r$.

The class of codes described in the COROLLARY is a generalization of three other classes of codes in the sense that it includes these classes as subclasses. The codes for $r = 2$ are twisted ring counter codes. The codes for $t = 0$ are the well-known Gray codes. The codes for $t = 1$ are equivalent to the Kautz codes; codes are said to be equivalent if they differ only in a permutation of columns.

The first $2(t+1)$ columns of the class of codes described in the COROLLARY can be permuted to obtain an equivalent calss of codes with a simple representation. Let $C$ be a twisted ring counter code with $t+1$ columns and $(t+1)2^{t-1}$ rows and let $C_1$ be a twisted ring counter code with $t+1$ columns and $2(t+1)$ rows. Then $C_2 = [C^*_1\ C^{**}_1]$ is a twisted ring counter code with its columns permuted. Repetitive application of the relation $C_i = [C^*_{i-1}\ C^{**}]$, $i = 2,3,4, \ldots$, for a given value of $t$, yields a family of codes $C_1, C_2, C_3, \ldots$, with a convenient recursive representation. Matrix $C_r$, $r = 1,2,3, \ldots$, will be used in the sequel to refer specifically to the code in this family that has $n = r(t+1)$ columns, $K = (t+1)2^r$ rows, and distance $k = 2t+1$. It will be assumed that the first rows of $C$ and $C_1$, and therefore of $C_r$, are all-zero.

Counting Circuitry

The above-mentioned recursive representation dictates one possible hardware implementation with the codes presently of interest. FIG. 1 is a representation of a general configuration of hardware elements useful in generating the desired code words. FIG. 1 shows an r-stage Gray code counter 100. As is typical for Gray code counters, there are generated on the set of $r$ output leads a pattern of $r$ bits which form the code words for a Gray code. The fundamentals of Gray codes and their associated counters are well known in the art and are described, for example, in U. S. Pat. No. 2,632,058, issued Mar. 17, 1953, to F. Gray.

Each of the outputs of Gray code counter 100 is connected as the input to a respective "twisted ring counter" 110–$i$, $i = 1,2,\ldots,r$. Twisted ring counters are also well known in the art and are described, for example, in W. Bleickardt "Multimoding and Its Suppression in Twisted Ring Counters," BSTJ, Vol. 47, Nov. 1968, pp. 2029–2050, and references cited therein. The twisted ring counters each have $t+1$ stages and therefore have $2(t+1)$ states.

To generate the desired set of code words it is assumed that all counters are initialized to 0 and that the twisted ring counters 110–$i$ advance to their next state when the respective Gray code counter output changes from 0 to 1 or from 1 to 0. Thus, in effect, the Gray code counter supplies a plurality of clock signals for application to the respective twisted ring counters. As the clock circuit (Gray code counter) 100 advances through its sequence of states, the outputs from the $r$ separate twisted ring counters provide the required $n$ outputs to generate the n-digit code words of $C_r$.

Figure 2:
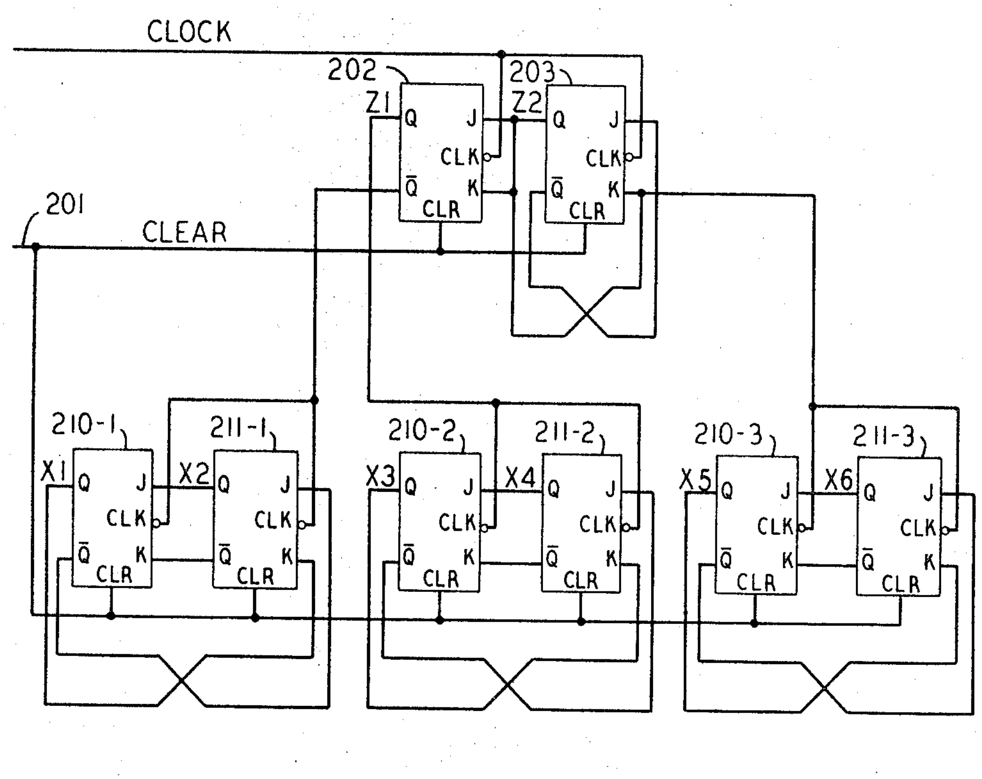
FIG. 2 is a particular example of circuitry for realizing the counting apparatus of FIG. 1 for the special case of $r = 3$ and $t = 1$, where $r$ and $t$ are defined below.

FIG. 2 is a typical circuit realization of the generalized counting apparatus shown in FIG. 1 for the case $r = 3$ and $t = 1$. The associated counting sequence appears in Table I.

TABLE I

| $X_1$ | $X_2$ | $X_3$ | $X_4$ | $X_5$ | $X_6$ | $Y_1$ | $Y_2$ | $Y_3$ | $\bar{Z}_1$ | $Z_1$ | $Z_2$ |
|---|---|---|---|---|---|---|---|---|---|---|---|
| 0 | 0 | 0 | 0 | 0 | 0 | 0 | 0 | 0 | 1 | 0 | 0 |
| 0 | 0 | 0 | 0 | 0 | 1 | 0 | 0 | 1 | 1 | 0 | 1 |
| 0 | 0 | 0 | 1 | 0 | 1 | 0 | 1 | 1 | 0 | 1 | 0 |
| 0 | 0 | 0 | 1 | 1 | 1 | 0 | 1 | 0 | 0 | 1 | 1 |
| 0 | 1 | 0 | 1 | 1 | 1 | 1 | 1 | 0 | 1 | 0 | 0 |
| 0 | 1 | 0 | 1 | 1 | 0 | 1 | 1 | 1 | 1 | 0 | 1 |
| 0 | 1 | 1 | 1 | 1 | 0 | 1 | 0 | 1 | 0 | 1 | 0 |
| 0 | 1 | 1 | 1 | 0 | 0 | 1 | 0 | 0 | 0 | 1 | 1 |
| 1 | 1 | 1 | 1 | 0 | 0 | 0 | 0 | 0 | 1 | 0 | 0 |
| 1 | 1 | 1 | 1 | 0 | 1 | 0 | 0 | 1 | 1 | 0 | 1 |
| 1 | 1 | 1 | 0 | 0 | 1 | 0 | 1 | 1 | 0 | 1 | 0 |
| 1 | 1 | 1 | 0 | 1 | 1 | 0 | 1 | 0 | 0 | 1 | 1 |
| 1 | 0 | 1 | 0 | 1 | 1 | 1 | 1 | 0 | 1 | 0 | 0 |

| | | | | | | | | | | | |
|---|---|---|---|---|---|---|---|---|---|---|---|
| 1 | 0 | 1 | 0 | 1 | 0 | 1 | 1 | 1 | 1 | 0 | 1 |
| 1 | 0 | 0 | 0 | 1 | 0 | 1 | 0 | 1 | 0 | 1 | 0 |
| 1 | 0 | 0 | 0 | 0 | 0 | 1 | 0 | 0 | 0 | 1 | 1 |

The output from the unit-distance coutner of FIG. 2 is, of course, $X = (X_1\ X_2\ X_3 \ldots X_n)$, and $n = r(t+1)$.

Each of the elements shown in FIG. 2 is a standard J–K flip-flop such as the Texas Instrument tupe SN7470. A clear lead 201 is used to initially set the two flip-flops 202 and 203 to their 0 states. Simultaneously, the J-K flip-flop in each of the two-stage twisted ring counters are also set to 0. That is, flip-flops 210–$i$ and 211–$i$, $i$ = 1,2 and 3, are set to 0. As will be clear to those skilled in the art, twisted ring counters constructed from J-K flip-flops count only when the clock makes a transition from 0 to 1. Thus, the outputs from an ordinary $(r-1)$-stage binary counter can be used to provide the clock signals. This follows from the following observation: for a Gray code counter, exactly one output makes a transition for each count; for an ordinary binary counter, at most one output makes a ZERO to ONE transition for each count. Furthermore, if $Z = (Z_1 Z_2 Z_3 \ldots Z_{r-1})$ is the output of an ordinary $(r-1)$-stage binary counter and $Y = (Y_1 Y_2 Y_3 \ldots Y_r)$ is the output of an r-stage Gray code counter, and if both counters are initialized to all-zero, then $Z_i$ will make a ZERO to ONE transition each time $Y_{i+1}$ makes a transition, $1 \leq i \leq r-1$, and $\bar{Z}_1$ will make a ZERO to ONE transition each time $Y_1$ makes a transition.

Figure 3:
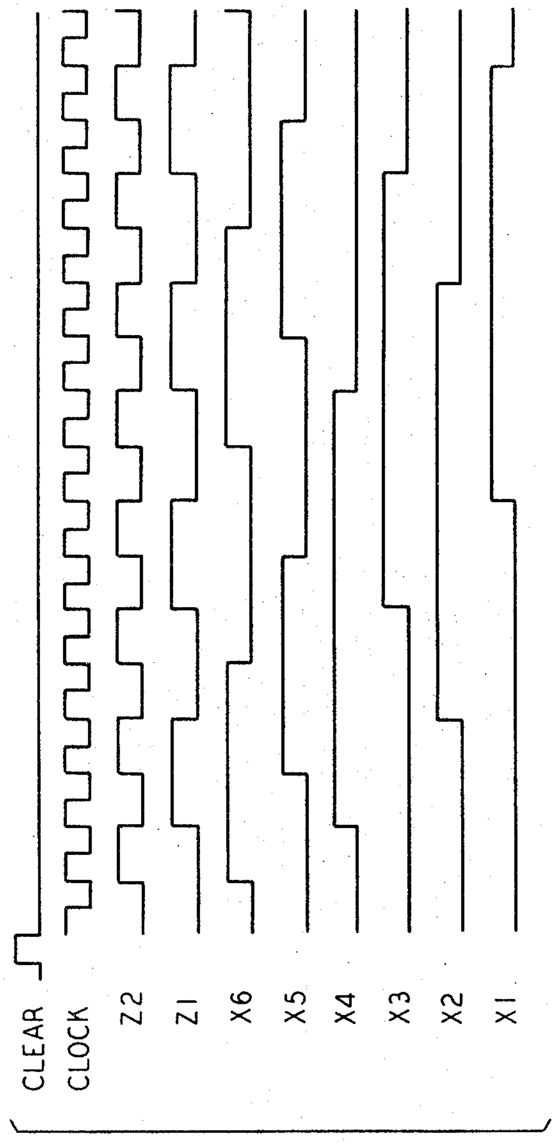
FIG. 3 is a timing diagram illustrating the sequence of clock signals and resulting state-indicating signals for the circuit of FIG. 2.

FIG. 3 shows a timing chart for the various signals appearing during the operation of the circuit of FIG. 2.

It should be clear that alternate means are available for providing the required clocking signals for the case of $r = 3$ and $t = 1$. In fact, for other particular values for $r$ and $t$ still other simplifications and/or degeneracies will occur.

Theoretical Considerations for Encoding and Decoding

A binary counting code is an ordered sequence of m-component binary vectors or words such that the numerical value of each vector is one more than the numerical value of the preceding vector modulo $2^m$. An $N \times m$ matrix $B$ whose $^{th}$ row is $b_j$, $1 \leq j \leq N$, will be called a binary code if $N$ is divisible by $2^m$ and its row vectors form a binary counting code when taken in sequence $b_1, b_2, b_3, \ldots, b_{N-1}, b_N$. Let $B^*$ be the $2N \times m$ matrix related to $B$ by $b^*_{2\,j-} = b^*_{2j} = b_j$, $1 \leq j \leq N$. The validity of the following LEMMA is obvious.

LEMMA 8: If $B_1$ is a 1/2 $N \times (m-1)$ binary code and $B_2$ is an $N \times 1$ binary code, then $[B^*_1\ B_2]$is a binary code.

Let $B$ be a binary code with one column and $2^t$ rows and let $B_1$ be a binary code with one column and two rows. Then repetitive application of the reltion $B_i = [B^*_{i-1} B]$, $i$ = 2,3,4, ....., yields a family of binary codes $B_1, B_2, B_3, \ldots$, with a convenient recursive representation. Matrix $B_m$, $m$ = 1,2,3, ..., will be used in the sequel to refer specifically to the code in this family that has $m$ columns and $2^m$ rows. It will be assumed that the first rows of $B$ and $\mathbf{B}_1$, and therefore $B_m$, are all-zero.

The error detection method to be developed can be described as follows. Suppose $t + 1 = 2^{m-r}$ so that $K = 2^m$. Suppose also that a set of equations that permit conversion back and forth between row $b_i$ of $B_m$ and row $c_i$ of $C_r$ are known, $1 \leq i \leq 2^m$. The decoding equations that convert $c_i$ to $b_i$ will convert an arbitrary n-component binary vector $w$ into some row of $B_m$. If this row is $b_j$, then the encoding equations that convert $b_i$ to $c_i$ will convert $b_j$ to $c_j$. Now if $w$ is row $i$ of $C_r$, that is, if $w = c_i$, then $c_j = c_i$ and $c_j = w$. But if $w$ is not a row of $C_r$, then $c_j \neq w$. Thus, any set of equations that permit conversion back and forth between $B_m$ and $C_r$ can be used to determine if an arbitrary n-component binary vector $w$ is a code word. If $w$ is not a code word, then an error condition has been detected.

It will be assumed in the sequel that $t + 1 = 2^{m-r}$ so that $K = 2^m$. The m-component binary vector $Z = (Z_1 Z_2 Z_3 \ldots Z_m)$ will be used to denote a row of $B_m$ and the n-component vector $X = (X_1\ X_2\ X_3 \ldots X_n)$ will be used to denote the corresponding row of $C_r$. The set of equations relating $Z$ to $X$ and $X$ to $Z$ will be considered.

The odd numbered rows of $C_r$ contain an even number of ONEs and the even numbered rows of $C_r$ contain an odd number of ONEs. It follows from this observation that for $m-r+1 \leq i \leq m$ $$Z_i = \sum_{j=1}^{(i-m+r)(t+1)} X_j$$
$$= X_1 \oplus X_2 \oplus \cdots \oplus X_{(i-m+r)(t+1)-1} \oplus X_{(i-m+r)(t+1)}.$$

Let $C$ be a twisted ring counter code with $t+1$ columns and $2(t+1)$ rows. Let B be a binary code with $m-r=1$ columns and $2^{m-r+1}$ rows. Let $C'$ be the $(t+1)2^r \times (t+1)$ matrix related to $C$ by $$c'_i = c_j,\ (j-1)(2^{r-1})+1 \leq i \leq j(2^{r-1}).$$

Let $B'$ be the $2^m \times (m-r+1)$ matrix related to $B$ by $$b'_i = b_j,\ (j-1)(2^{r-1})+1 \leq i \leq j(2^{r-1}).$$

The submatrix consisting of the first $t+1$ columns of $C_r$ is $C'$. The submatrix consisting of the first $m-r+1$ columns of $B_m$ is $B'$. It follows from this observation that $Z_i$ for $1 \leq i \leq m-r+1$ can be expressed in terms of those $X_j$ with $1 \leq j \leq t-1$. It is easily verified that for $1 \leq i \leq m-r+1$ $$Z_i = \sum_{j=0}^{2^{i-1}-1} X_{jp+1} \text{ where } p = \frac{t+1}{2^{i-1}} = 2^{m-r-i+1}.$$

For any $t \geq 0$ and any $r \geq 1$ these formulas provide a full set of $m$ equations relating $Z$ to $X$.

Now $X_j$ for $1 \leq j \leq t+1$ can also be expressed in terms of those $Z_i$ with $1 \leq i \leq m-r+1$. For $r \geq 2$ the submatrices consisting of the last $t+1$ columns of $C_r$ and the last $m-r+2$ columns of $B_m$, respectively, are $$\begin{bmatrix} C_1^{} \\ C_1^{} \\ \vdots \\ C_1^{**} \end{bmatrix} \text{ and } \begin{bmatrix} B_{m-r+2} \\ B_{m-r+2} \\ \vdots \\ B_{m-r+2} \end{bmatrix}$$

where there are $2^{r-2}$ repetitions of $C^{**}_1$ and of $B_{m-r+2}$. These observations establish the following LEMMAs.

LEMMA 9: For $1 \leq j \leq t+1$, , $X_j$ can be expressed in terms of those $Z_i$ with $1 \leq i \leq m-r+1$.

LEMMA 10: For $1 \leq p \leq r-1$ and $p(t+1)+1 \leq j \leq (p+1)(t+1)$, $X_j$ can be expressed in terms of those $Z_i$ with $p \leq i \leq p+m-r+1$.

LEMMA 11: For $t+2 \leq j_1 \leq n$ and $t+2 \leq j_2 \leq n$, $X_{j_1}$ and $X_{j_2}$ differ in a transfomration of variables if and only if $j_1 \equiv j_2$ modulo $t+1$; and, if $t+2 \leq j_1 \leq 2(t+1)$ and $j_2 = j_1 + (p-1)(t+1)$ for some $p$, $1 \leq p \leq r-1$, then the required transformation of variables is accomplished by replacing $X_{j_1}$ with $X_{j_2}$ and $Z_i$ with $Z_{i+p-1}$, $1 \leq i \leq m-r+2$.

Two equations are said to be in the same equivalence class if they differ only in a transformation of variables. Although there are $n = r(t+1)$ equations relating $X$ to $Z$ there are only $2(t+1)$ equivalence classes; each of the equations for $X_j$ with $1 \leq j \leq t+1$, forms an equivalence class. This property greatly reduces the computational task of determining the $n$ equations. The computational task is also reduced by the fact that the equations for the code with parameter $m-r$ differ from half the equations for the code with parameter $m-r+1$ by transformation of variables.

For example, if $t = 0$ then $m = n = r$ and the equations are the well-known equations that relate the Gray and binary codes, $$X_1 = Z_1$$

$$X_{j+1} = Z_j \oplus Z_{j+1},\ 1 \leq j \leq n-1$$

and $$Z_i = \sum_{j=1}^{i} X_j,\ 1 \leq i \leq n.$$

If $t = 1$ then $n = 2m-2$ and the equations are $$X_1 = Z_1$$

$$X_2 = Z_1 \oplus Z_2$$

$$X_{2j+1} = Z_j \oplus Z_{j+1} Z_{j+2}$$

$$1 \leq j \leq r-1$$

$$X_{2j+2} = \bar{Z}_j \oplus \bar{Z}_{j+1} \bar{Z}_{j+2}$$

and $$Z_1 = X_1$$

$$Z_i = \sum_{j=1}^{2(i-1)} X_j,\ 2 \leq i \leq m.$$

If $t = 3$ then $n = 4m - 8$ and the equations are $$X_1 = Z_1$$

$$X_2 = Z_1 \oplus Z_2 Z_3$$

$$X_3 = Z_1 \oplus Z_2$$

$$X_4 = \bar{Z}_1 \oplus \bar{Z}_2 \bar{Z}_3$$

$$X_{4j+1} = Z_j \oplus Z_{j+1} Z_{j+2} Z_{j+3}$$

$$X_{4j+2} = Z_j \oplus Z_{j+1}(Z_{j+2} + Z_{j+3})$$

$$1 \leq j \leq r-1$$

$$X_{4j+3} = \bar{Z}_j \oplus \bar{Z}_{j+1}(\bar{Z}_{j+2} + \bar{Z}_{j+3})$$

$$X_{4j+4} = \bar{Z}_j \oplus \bar{Z}_{j+1} \bar{Z}_{j+2} \bar{Z}_{j+3}$$

and $$Z_1 = X_1$$

$$Z_2 = X_1 \oplus X_3$$

$$Z_i = \sum_{j=1}^{4(i-2)} X_j,\ 3 \leq i \leq m.$$

Equations for $M-r>2$ are easily obtained and will not be listed.

If Y is the row of a Gray code, with $m$ columns and $2^m$ rows, that corresponds to $X$ and $Z$, then equations relating Y to $X$ are readily found:

$$Y_1 = X_1$$

$$Y_i = \sum_{j=1}^{2^{i-2}} X_{(2j-1)p+1} \text{ where } p = \frac{t+1}{2^{i-1}},\ 2 \leq i \leq m-r+1$$

$$Y_i = \sum_{j=(i-m+r)(t+1)-t}^{(i-m+r)(t+1)} X_j,\ m-r+2 \leq i \leq m.$$

Note that $X = Y$ when $t = 0$.

Error Dectection Circuitry

Figure 4:
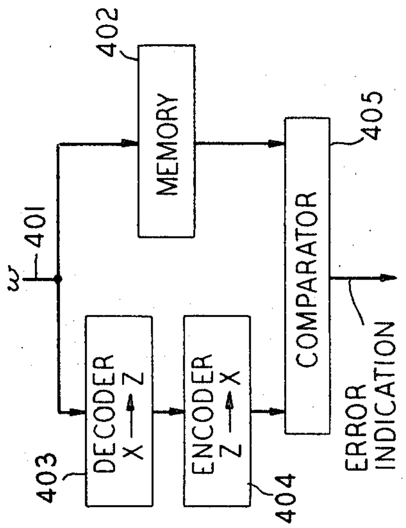
FIG. 4 shows the overall organization of error-detection apparatus using codes in accordance with the instant invention.

From the above discussion, it becomes clear that the presently developed class of counting codes may be used to advantage in systems requiring accuracy in received data (such as pulse code communication systems) as well as in reliable control and data processing systems. FIG. 4 illustrates the general configuration for error-detection apparatus in accordance with the instant invention.

Thus, an arbitrary n-digit word is shown being received on input lead 401. This input word is temporarily stored in memory 402 and delivered to decoder 403. Decoder 403 performs the X to Z transformation described above. Next, the vector resulting from the $X$ to $Z$ transformation is itself transformed by encoder 404. If the original received vector $w$ was a valid code word, a row $c_j$ in the matrix $C_r$, then the double transformation will yield the same received vector $w = c_j$. If $w$ was not a valid code word, $w \neq c_j$ for any $j$, then the double transformation will not yield the same received vector. Thus, comparator 405 is used to compare the result of the $Z$ to $X$ transformation with the received $Z$ vector stored in memory 402. If an error is detected, an appropriate alarm signal is generated as the output from comparator 405; otherwise, the received vector may be cleared from memory 402 and delivered to an appropriate utilization circuit. In other circumstances, the mere verification of the validity of the vector $w$ is all that is required.

To further illustrate the manner of making and using the instant invention, typical circuits for performing the decoding and encoding operations indicated in FIG. 4 will be presented. In particular, the appropriate transforming circuitry used with the counting circuit of FIG. 2 will be presented.

Figure 5:
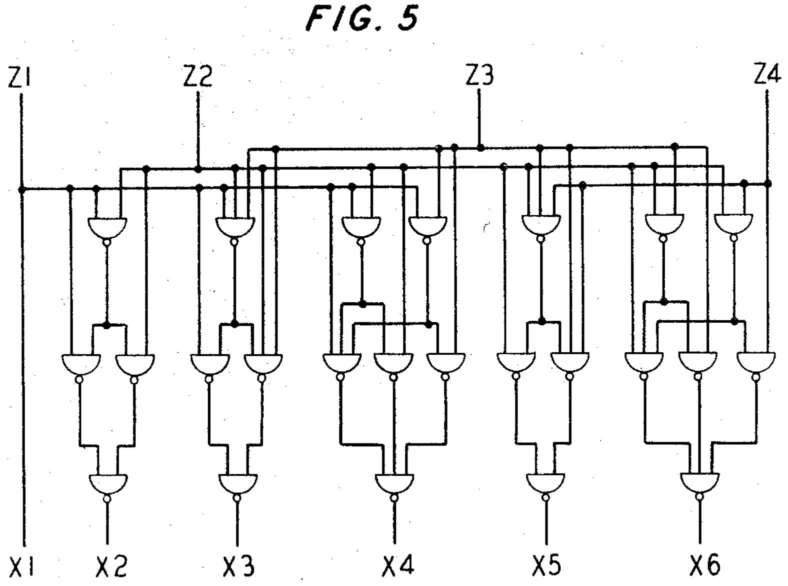
FIG. 5 illustrates an encoder circuit for use with the apparatus of FIG. 4 for the case of $r = 3$, $t = 1$.
Figure 6:
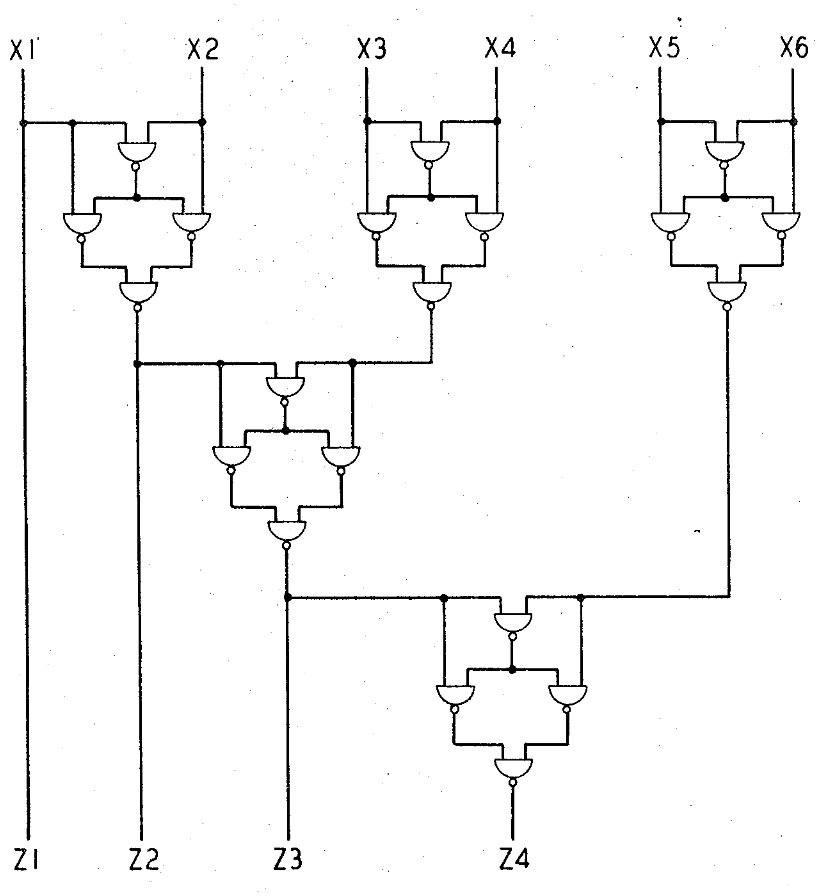
FIG. 6 illustrates a decoder circuit for use with the apparatus of FIG. 4 for the case of $r = 3$, $t = 1$.

Thus, for the case $r = 3$ and $t = 1$, the circuits of FIGS. 5 and 6 comprising a number of NAND gates may be used to perform the encoder and decoder functions, respectively. It is apparent from FIGS. 5 and 6 that the corresponding $X$ and $Z$ vectors, shown in Table II, can be generated therefrom.

TABLE II

| $Z_1$ | $Z_2$ | $Z_3$ | $Z_4$ | $X_1$ | $X_2$ | $X_3$ | $X_4$ | $X_5$ | $X_6$ |
|---|---|---|---|---|---|---|---|---|---|
| 0 | 0 | 0 | 0 | 0 | 0 | 0 | 0 | 0 | 0 |
| 0 | 0 | 0 | 1 | 0 | 0 | 0 | 0 | 0 | 1 |
| 0 | 0 | 1 | 0 | 0 | 0 | 0 | 1 | 0 | 1 |
| 0 | 0 | 1 | 1 | 0 | 0 | 0 | 1 | 1 | 1 |
| 0 | 1 | 0 | 0 | 0 | 1 | 0 | 1 | 1 | 1 |
| 0 | 1 | 0 | 1 | 0 | 1 | 0 | 1 | 1 | 0 |

| | | | |
|---|---|---|---|
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

| | | | | | |
|---|---|---|---|---|---|
| 0 | 1 | 1 | 1 | 1 | 0 |
| 0 | 1 | 1 | 1 | 0 | 0 |
| 1 | 1 | 1 | 1 | 0 | 0 |
| 1 | 1 | 1 | 1 | 0 | 1 |
| 1 | 1 | 1 | 0 | 0 | 1 |
| 1 | 1 | 1 | 0 | 1 | 1 |
| 1 | 0 | 1 | 0 | 1 | 1 |
| 1 | 0 | 1 | 0 | 1 | 0 |
| 1 | 0 | 0 | 0 | 1 | 0 |
| 1 | 0 | 0 | 0 | 0 | 0 |

Conclusions, Extensions and Generalizations

A class of codes that is easy to count, and that contains families of codes that are easy to convert to and from ordinary binary codes, has been presented and an error detection method for codes with $2^m$ words has been described. The codes are highly structured and it is perhaps because of this fact that counting, encoding and decoding are relatively simple.

The structure of these codes can be characterized as follows: Each column of the $K \times n$ code matrix consists of alternating spans of ZEROs and ONEs such that all spans of a given column have the same length. If column $i$, $1 \leq i \leq n$, consists of $u_i$ spans of length $v_i$, then $u_i$ is even, $$u_i v_i = K, \text{ and } \sum_{j=1}^{n} u_i = K.$$

If $K=2^m$ such codes have relatively simple conversion relationships to the ordinary binary counting codes.

Although the detailed description above has proceeded in terms of binary codes, it is clear that the construction and implementations can be readily extended to obtain nonbinary unit-distance counting codes, that is, codes for which $q > 2$. For example, if $K$ is a multiple of $qn$ and if for $c_j = (w_1\, w_2\, w_3 \ldots w_{n-2}\, w_{n-1}\, w_n)$ it is true that $c_{j+1} = (w_2\, w_3\, w_4 \ldots w_{n-1}\, w_n\, \overline{w}_1)$, $1 \leq j \leq K-1$, where the value of $w_1$ is $w_1+1$ modulo $q$, then is called a q-ary twisted ring counter code.

Numerous and varied other modifications and variations within the spirit and scope of the attached claims will occur to those skilled in the art.

What is claimed is:

1. Apparatus for generating a sequence of code words comprising
   a. a first counter responsive to an applied input sequence of clock pulses for generating state-indicating signals on a first plurality of output leads, and
   b. a plurality of additional counters, each responsive to signals appearing on a respective one of said first plurality of output leads from said first counter for generating a component of said code words on a second plurality of output leads, the ordered output from the totality of said additional counters, representing said code words wherein said first counter comprises means for changing the signals on only a single output lead in response to a given clock pulse.

2. Apparatus according to claim 1 wherein said first counter comprises an r-stage Gray code counter.

3. Apparatus according to claim 2 wherein each of said additional counters comprises a $(t+1)$-stage twisted ring counter.

4. Apparatus for detecting an error in a first n-digit word comprising
   a. means for transforming said first n-digit word into a corresponding m-digit word in accordance with a many-to-one relationship,
   b. means for transforming said m-digit word into a second n-digit word in accordance with a one-to-one relationship, and
   c. means for comparing said first n-digit word with said second n-digit word whereby an error in said first n-digit word will result in a signal generated by said means for comparing, said signal corresponding to a dissimilarity in said first and second n-digit words.

5. A method for detecting an error in a first n-digit word comprising the steps of
   a. transforming said first n-digit word into a corresponding m-digit word in accordance with a many-to-one relationship,
   b. transforming said m-digit word into a second n-digit word in accordance with a one-to-one relationship, and
   c. comparing said first n-digit word with said second n-digit word such that an error in said first n-digit word is detected when said first and second n-digit words are not the same.

* * * * *